(No Model.)

G. F. FILLEY.
Cooking Stove.

No. 237,101.

Patented Feb. 1, 1881.

Attest:
Charles Pickles
John U. Papp

Inventor:
Giles F. Filley
by C. D. Moody
atty.

United States Patent Office.

GILES F. FILLEY, OF ST. LOUIS, MISSOURI.

COOKING-STOVE.

SPECIFICATION forming part of Letters Patent No. 237,101, dated February 1, 1881.

Application filed December 6, 1880. (No model.)

*To all whom it may concern:*

Be it known that I, GILES F. FILLEY, of St. Louis, Missouri, have made a new and useful Improvement in Cooking Stoves and Ranges, of which the following is a full, clear, and exact description, reference being had to the annexed drawings, making part of this specification, in which—

Figure 1:
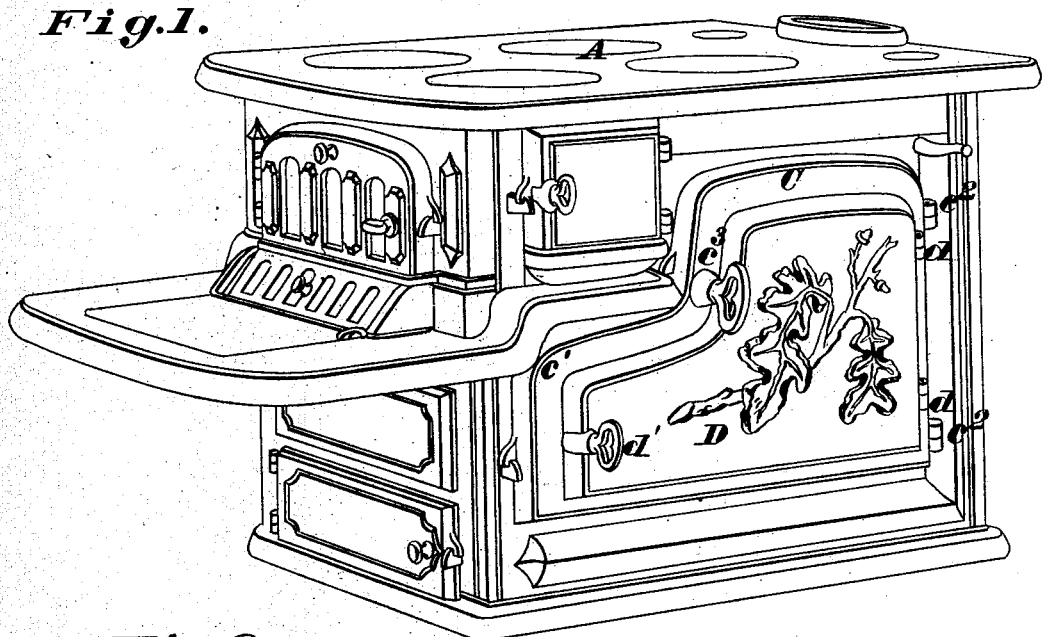
Figure 2:
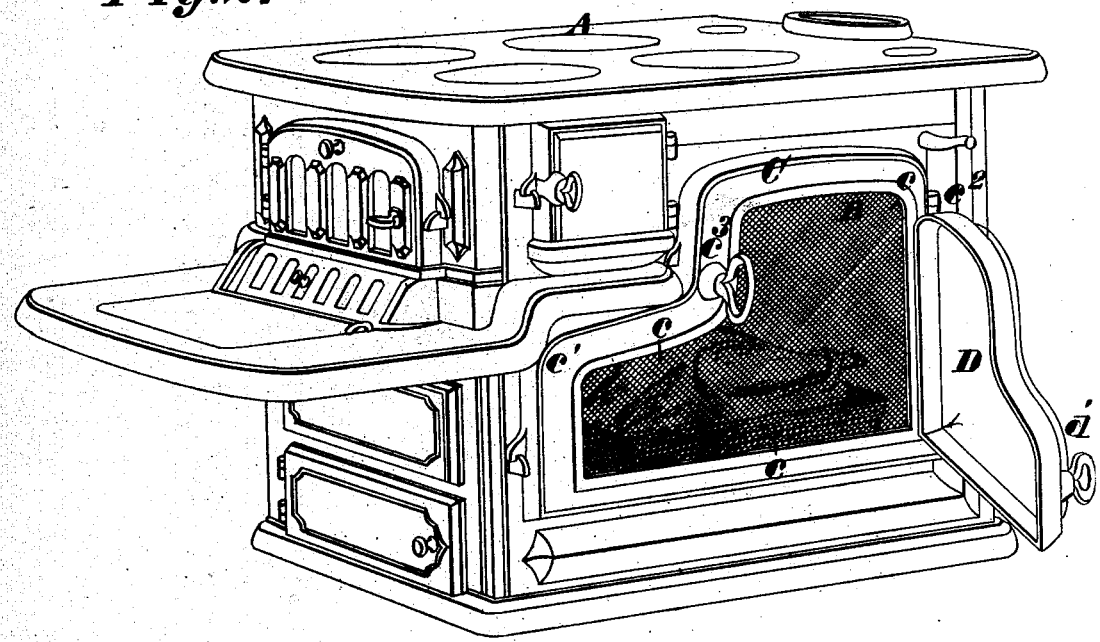

Figure 1 is a view, in perspective, of a cooking-stove having the improvement, the outer oven-door being closed; and Fig. 2, a similar view, saving that the outer oven-door is opened.

The same letters denote the same parts.

I have heretofore made an improvement in cooking stoves and ranges, the aim and effect of which is to enable the outer air to directly and freely pass into and through the oven during the cooking, the improvement consisting in finely perforating the oven door or doors, the air entering and leaving the oven through the perforations.

The present improvement consists in providing the oven with an outer imperforate door, enabling the oven, when desired, to be closed against the admission of the air.

Referring to the drawings, A represents a cooking-stove having the improvement, and, saving as modified thereby, being of the usual description, B being the oven, and C the main and inner oven-door, perforated as in the original construction, the perforated portion $c$ being preferably in the form of gauze held in the frame $c'$, which is hinged at $c^2 c^2$, and provided with the handle $c^3$.

D represents an outer oven-door. It is imperforate, hinged at $d\ d$, provided with the handle $d'$, and when closed, as in Fig. 1, it covers the perforated portion $c$ of the inner oven-door, C. By this means the oven can be entirely closed, as seen in Fig. 1, or the outer door, D, can be opened, as in Fig. 2. At times and with certain articles of food it is desirable to close both doors, and even in cooking a certain article it may be desired to entirely close the oven at certain stages of the operation. The outer door is also a protection in shipping the stove or when the stove is not being used.

I am aware that the furnace-chamber of a heating-stove has heretofore been provided with an inner perforated and an outer close door.

I claim—

In a cooking stove or range, the oven B, having an inner perforated door, C, and an outer imperforate door, D, substantially as described, and for the purpose set forth.

GILES F. FILLEY.

Witnesses:
 C. D. MOODY,
 CHARLES PICKLES.